3,341,332
LIGHT-SENSITIVE PHOTOGRAPHIC MATERIAL CONTAINING POLYALKENOYLMORPHOLINE

Yosuke Nakajima and Daijiro Nishio, Minami-Ashigara-machi, and Fumihiko Nishio, Odawara-shi, Japan, assignors to Fuji Shashin Film Kabushiki Kaisha, Kanagawa-ken, Japan, a corporation of Japan
No Drawing. Filed July 20, 1964, Ser. No. 383,972
Claims priority, application Japan, July 24, 1963, 38/37,292
4 Claims. (Cl. 96—107)

This invention relates to a gelatin-silver halide light-sensitive photographic material containing polyalkenoylmorpholine.

It has been hitherto proposed to add a heavy metal salt or sulfur compound to a photographic emulsion in order to improve the characteristics of the photographic emulsion, which has reached a limit. On the other hand, in order to reduce to a minimum the defect of the gelatin, efforts have been made to substitute all parts or a part of the gelatin with a natural or synthetic high molecular compound except gelatin, but these are unavoidable from such difficulties that an increase in fog is given with the passage of time and the compatibility with gelatin is deficient. (D.P. 1,120,272, U.S.P. 3,003,878, Belg. P. 592,477.)

The object of this invention is to provide a method for improving the characteristics of the gelatin-silver halide photographic emulsion without an increase in fog with the passage of time. In more detail, in accordance with the present invention, there is the provision of a light-sensitive photographic material including polyalkenoylmorpholine represented by the following general formula in its layer of the gelatin-silver halide photographic emulsion or the adjacent layer thereof:

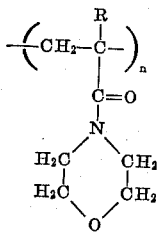

in which R is H or $CH_3$ and $n$ is a positive integer.

We have found that the use of the polyalkenoylmorpholine in a percentage of 3 to 40%, preferably 6 to 20% based on the total weight of the binder of the emulsion results in satisfactory results. In adding it to the adjacent layer, a percentage of 10 to 40% is preferred.

In accordance with the present invention, it is possible to increase the gamma, effective sensitivity and maximum density without formation of fog.

Polyacryloylmorpholine is produced by polymerizing acryloylmorpholine obtained by reaction of acryloyl chloride and morpholine and polymethacryloylmorpholine is produced by polymerizing methacryloylmorpholine obtained by reaction of methacryloyl chloride and morpholine. If the degree of polymerization is too high, the compatibility with gelatin decreases and therefore it is required to keep the intrinsic viscosity in N,N-dimethylformamide at 35° C. below 2.0.

Polyalkenoylmorpholine may be added to the emulsion at any time, but the addition is preferably conducted after the second ripening and before the coating.

The present invention may be adapted for any silver halide emulsion such as a silver iodobromide emulsion and chlorobromide emulsion, and in particular suitable for an emulsion for radiography or lithography. The emulsion may undergo the sulfur sensitizing and/or gold sensitizing and may be mixed with an optical sensitizer, polyalkylene oxide sensitizer, stabilizer, hardening agent, coating aid and coupler.

The base to be coated with the photographic emulsion including polyalkenoylmorpholine produced according to our invention may be composed of any of the conventional film base materials. This may be a sheeting of glass, cellulose triacetate, polyethylene terephthalate, polycarbonate, polystyrene, polypropylene and paper.

The following examples and synthesizing examples are illustrative of our invention, which are not intended to limit it.

SYNTHESIZING EXAMPLE 1

Synthesis of polyacryloylmorpholine

A mixed solution of 91 g. (1 mol) of acryloyl chloride and 500 ml. of toluene was stirred with cooling by ice. To the solution, a mixed solution of 87 g. (1 mol) of morpholine and 101 g. (1 mol) of triethylamine was added dropwise. The dropping velocity was controlled so as to proceed the exothermic reaction at below 10° C. After the addition of the amines, stirring was continued at below 10° C. for 2 hours to accomplish the reaction. The resulting triethylamine hydrochloride was filtered off and washed with toluene. The filtrate and toluene used were combined and distilled under reduced pressure to remove toluene. A small amount of hydroquinone was added thereto and distilled under reduced pressure to give 106 g. (75%) of a fraction having B.P. of 108 to 112° C./4 mm. Hg. The fraction was further distilled in the Vigoureux fractionating column of 10 cm. to give a colorless oily material having B.P. of 72 to 73° C./1 mm. Hg. $n_D^{20}$:1.5111.

*Analysis.*—For $C_7H_{11}NO_2$—Calculated: C, 59.60%; H, 7.80%; N, 9.94%. Found: C, 59.50%; H, 7.72%; N, 9.44.

To a solution of 150 g. of acryloylmorpholine in 500 ml. of N,N-dimethylformamide was added 0.07 g. (0.05%) of alpha, alpha'-azobisisobutylonitrile and the mixture was stirred at 70° C. in nitrogen for 8 hours. The resulting viscous polymerized solution was poured in excess methanol to precipitate a white pasty polymer. This was with methanol, dissolved in water and dried by a freeze drying system to give a white powdered polymer, 140 g. (polymer conversion: 95%). The intrinsic viscosity ($\eta$) in N,N-dimethylformamide at 35° C. was 0.25.

*Analysis.*—For $(C_7H_{11}NO_2)_n$—Calculated: N, 9.94%. Found: N, 10.22%.

(Reference: J. Polymer Sci., 29 411 (1958), J. Polymer Sci. 48 357 (1960), J. Polymer Sci., 51 159 (1963).)

SYNTHESIZING EXAMPLE 2

Synthesis of polymethacryloylmorpholine

The monomer was synthesized from methacrylolyl chloride in the same manner as in Synthesizing Example 1. Colorless oily material, B.P. 94.5° C., Yield 76%, $n_D^{20}$ 1.4930.

*Analysis.*—For $C_8H_{13}NO_2$—Calculated: N, 9.03%. Found: N, 8.92%.

To a solution of 80 g. of methacryloylmorpholine in 150 ml. of N,N-dimethylformamide was added 0.04 g. (0.05%) of alpha, alpha'-azobisisobutylonitrile and the polymerization was carried out in a sealed tube filled with nitrogen at 70° C. for 10 hours. The resulting polymer was precipitated by methanol, dissolved in water and dried by a freeze drying system to give 80 g. (polymer conversion: 100%) of a white powdered polymer. The intrinsic viscosity ($\eta$) in N,N-dimethylformamide at 35° C. was 0.38.

EXAMPLE 1

A high speed gelatin-silver halide photographic emulsion for X-ray containing 330 g. of gelatin and 2.0 mol of silver halide consisting of 1.5 mol percent of silver iodide and 98.5 mol percent of silver bromide and ripened to an optimum sensitivity by a sulfur sensitizer and gold sensitizer was divided into three equal parts and its each part was added to (1) 60 cc. of a 10% aqueous solution of polyacryloylmorpholine $((\eta)=0.36)$, (2) 60 cc. of a 10% aqueous solution of inert gelatin and (3) 60 cc. of water respectively. The each emulsion was applied to a cellulose triacetate film base in equal thickness and dried. The coated film base was exposed in an intensity-scale sensitometer provided with a blue filter for 1/20 second and developed at 20° C. for 4 minutes by a developing solution having the following composition:

| | G. |
|---|---|
| N-methyl-p-aminophenol-sulfonic acid | 4 |
| Anhydrous sodium sulfite | 60 |
| Hydroquinone | 10 |
| Sodium carbonate monohydrate | 53 |
| Potassium bromide | 3 |
| Water to 1 liter. | |

It was found by the sensitometry that the maximum density, gamma and effective sensitivity were raised as shown in the following table, in which the effective sensitivity is represented by a relative reciprocal value of the exposure amount required for giving a density of 0.5 above the fog.

| | Maximum density | Gamma | Effective sensitivity | Fog |
|---|---|---|---|---|
| 1 | 2.77 | 2.75 | 118 | 0.06 |
| 2 | 2.04 | 2.41 | 118 | 0.06 |
| 3 | 2.21 | 2.49 | 103 | 0.06 |

EXAMPLE 2

The emulsion used in Example 1 was divided into three equal parts and its each part was added to 90 cc. of a 10% aqueous solution of (1) polyacryloylmorpholine $((\eta)=0.36)$, (2) polyvinylpyrrolidone (D.P.=40,000) and (3) inert gelatin respectively. To the each emulsion were added 20 cc. of a 1% aqueous solution of 4-hydroxy-6-methyl-1,3,3a,7-tetrazaindene as stabilizer, 2 cc. of a 10% aqueous solution of chrome alum as hardening agent and 2 cc. of a 6% solution of saponin as coating aid. Then, the mixed emulsion was applied to a cellulose triacetate film base and dried to give a layer of 20-micron thickness, which was subjected to a duration test in a high temperature and humidity. The results are as follows:

| | Standing at normal temp. and humidity | | At 35° C., 80% RH, 14 days | |
|---|---|---|---|---|
| | Gamma | Fog | Gamma | Fog |
| (1) | 3.09 | 0.06 | 3.03 | 0.08 |
| (2) | 3.11 | 0.08 | 2.97 | 0.13 |
| (3) | 2.54 | 0.06 | 2.46 | 0.08 |

It is evident from the above table that polyacryloylmorpholine hardly forms the fog with the passage of time.

EXAMPLE 3

A negative high speed gelatin-silver halide photographic emulsion containing 80 g. of gelatin and 1.0 mol of silver halide consisting of 5 mol percent of silver iodide and 95 mol percent of silver bromide and ripened to an optimum sensitivity by a sulfur sensitizer and gold sensitizer was divided into two equal parts and its each part was added to 10 g. of (1) polymethacryloylmorpholine $(\eta)=0.38$ and (2) inert gelatin. Then, the each emulsion was mixed with an optical sensitizer, hardener, stabilizer and coating aid in an equal amount, applied to a cellulose triacetate film base and dried to form a layer of 10-micron thickness. The each coating was exposed in an intensity-scale sensitometer of 5400° K. for 1/50 second and developed at 20° C. for 10 minutes by a developing solution having the following composition:

| | G. |
|---|---|
| N-methyl-p-aminophenol-sulfonic acid | 2 |
| Hydroquinone | 5 |
| Anhydrous sodium sulfite | 100 |
| Borax | 2 |
| Water to 1 liter. | |

It is evident from the comparison of the both, as shown in the following table, that polymethacryloylmorpholine has an excellent effect for raising gamma and effective sensitivity. The effective sensitivity is represented by a relative speed of giving a density of 0.5 above the fog.

| | Effective sensitivity | Gamma | Fog |
|---|---|---|---|
| (1) | 123 | 0.76 | 0.06 |
| (2) | 100 | 0.62 | 0.06 |

EXAMPLE 4

The photographic emulsion used in Example 1 was applied to a cellulose triacetate film base in 15-micron thickness and divided into two parts, on which (1) a solution of 20 g. of gelatin and 5 g. of polyacryloylmorpholine in 1 liter of water, and (2) a solution of 25 g. of gelatin in 1 liter of water were coated in 2 micron thickness respectively, followed by drying. The exposure and development were carried out in the same manner as in Example 1 to obtain the following results:

(1) Gamma, 2.51; fog, 0.06.
(2) Gamma, 2.42; fog, 0.06.

What is claimed is:

1. A light sensitive photographic material comprising a support, at least one photographic silver halide emulsion layer, auxiliary layers, and incorporated in at least one of said layers polyalkenoylmorpholine represented by the general formula

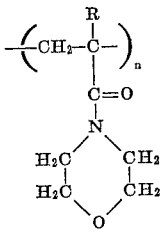

wherein R is a member selected from the group consisting of H and CH₃, and $n$ is a positive integer.

2. The light sensitive photographic material according to claim 1 wherein said layer containing said polyalkenoylmorpholine is a photographic silver halide emulsion layer and the content of the polyalkenoylmorpholine is 3–40% by weight particularly 6–20% by weight based on total binders in the emulsion layer.

3. The light sensitive photographic material according to claim 1 wherein said layer containing said polyalkenoylmorpholine is an auxiliary layer and the content of the polyalkenoylmorpholine is 10–40% by weight.

4. The light sensitive photographic material according to claim 1 wherein the intrinsic viscosity of said polyalkenoylmorpholine in N,N-dimethylformamide at 35° C. is less than about 2.0.

No references cited.

NORMAN G. TORCHIN, *Primary Examiner.*

J. H. RAUBITSCHEK, *Assistant Examiner.*